United States Patent
Nakamura et al.

(10) Patent No.: US 12,435,451 B2
(45) Date of Patent: Oct. 7, 2025

(54) METHOD FOR MANUFACTURING PRECURSOR FIBER BUNDLE, METHOD FOR MANUFACTURING CARBON FIBER BUNDLE, AND CARBON FIBER BUNDLE

(71) Applicant: TEIJIN LIMITED, Osaka (JP)

(72) Inventors: Yosuke Nakamura, Osaka (JP); Atsumi Nishida, Osaka (JP); Hidekazu Yoshikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 675 days.

(21) Appl. No.: 17/282,441

(22) PCT Filed: Oct. 2, 2019

(86) PCT No.: PCT/JP2019/038976
§ 371 (c)(1),
(2) Date: Apr. 2, 2021

(87) PCT Pub. No.: WO2020/071445
PCT Pub. Date: Apr. 9, 2020

(65) Prior Publication Data
US 2021/0381133 A1    Dec. 9, 2021

(30) Foreign Application Priority Data

Oct. 5, 2018  (JP) .................................. 2018-190505

(51) Int. Cl.
*D01F 9/22*   (2006.01)
*D01D 5/06*   (2006.01)
*D01F 6/38*   (2006.01)

(52) U.S. Cl.
CPC ............... *D01F 9/225* (2013.01); *D01D 5/06* (2013.01); *D01F 6/38* (2013.01)

(58) Field of Classification Search
CPC .. D01F 9/225; D01F 6/38; D01F 6/18; D01D 5/06; D02J 1/22; D02J 13/005; D02J 1/08
See application file for complete search history.

(56) References Cited

U.S. PATENT DOCUMENTS 6,103,211 A * 8/2000 Matsuhisa ............... D01F 11/14
423/447.8
6,294,252 B1 * 9/2001 Yamanaka ................ D01F 9/22
428/401

(Continued)

FOREIGN PATENT DOCUMENTS

JP    8-158163 A    6/1996
JP    2002-69754 A   3/2002

(Continued)

OTHER PUBLICATIONS

International Search Report for PCT/JP2019/038976 dated Dec. 3, 2019 (PCT/ISA/210).

*Primary Examiner* — Elizabeth M Imani
(74) *Attorney, Agent, or Firm* — Sughrue Mion, PLLC (57) ABSTRACT

A method for manufacturing a precursor fiber bundle provides precursor fiber bundles used in manufacturing carbon fiber bundles allowing high productivity and having high tensile strength with less yarn bundle divides in the fiber bundles. The method for manufacturing a precursor fiber bundle includes spinning by extruding a spinning solution through a spinneret to produce a coagulated fiber bundle, and interlacing the coagulated fiber bundle by applying a fluid onto the coagulated fiber bundle. The interlacing includes applying the fluid (18) under a pressure in a range of 0.01 to 0.05 MPa onto the coagulated fiber bundle (14) with a moisture content in a range of 25 to 50% under a tension of 0.02 g/dtex or less.

11 Claims, 3 Drawing Sheets

(56) References Cited

U.S. PATENT DOCUMENTS

| | | | | |
|---|---|---|---|---|
| 2010/0252438 A1* | 10/2010 | Yoshikawa | ............... | D02J 1/08 |
| | | | | 205/159 |
| 2010/0252439 A1 | 10/2010 | Yoshikawa et al. | | |
| 2015/0094401 A1* | 4/2015 | Kiriyama | .................. | D01F 6/38 |
| | | | | 423/447.2 |
| 2019/0136417 A1 | 5/2019 | Matsumoto et al. | | |
| 2019/0226124 A1* | 7/2019 | Okuda | ............... | B01D 39/2065 |
| 2020/0002850 A1 | 1/2020 | Matsuyama et al. | | |

FOREIGN PATENT DOCUMENTS

| | | | | |
|---|---|---|---|---|
| JP | 2002-220726 A | 8/2002 | | |
| JP | 2009-256833 A | 11/2009 | | |
| JP | 2009-293140 A | 12/2009 | | |
| JP | 2012-154000 A | 8/2012 | | |
| JP | 5264150 B2 | 8/2013 | | |
| JP | 2014-141760 A | 8/2014 | | |
| JP | 2017-137602 A | 8/2017 | | |
| JP | 2018-31083 A | 3/2018 | | |
| WO | 2009/060653 A1 | 5/2009 | | |
| WO | 2017/204026 A1 | 11/2017 | | |
| WO | WO-2018003836 A1 * | 1/2018 | ......... | B01D 39/2065 |
| WO | 2018/151255 A1 | 8/2018 | | |

* cited by examiner

White areas indicate slits.

FIG.3C

A white area indicates a strand portion.

METHOD FOR MANUFACTURING PRECURSOR FIBER BUNDLE, METHOD FOR MANUFACTURING CARBON FIBER BUNDLE, AND CARBON FIBER BUNDLE

CROSS REFERENCE TO RELATED APPLICATIONS

This application is a National Stage of International Application No. PCT/JP2019/038976 filed Oct. 2, 2019, claiming priority based on Japanese Patent Application No. 2018-190505 filed Oct. 5, 2018.

TECHNICAL FIELD

The present invention relates to a method for manufacturing a precursor fiber bundle used for manufacturing a carbon fiber bundle, a method for manufacturing a carbon fiber bundle using the precursor fiber bundle, and a carbon fiber bundle.

BACKGROUND ART

Carbon fibers have high specific strength, a high specific modulus, light weight, and are used as reinforcement fibers for thermosetting and thermoplastic resins in various applications, including aviation, aerospace, and automobile applications, in addition to traditional sports and industrial applications. The recent increasing superiority of carbon fiber composite materials has increased the demand for higher performance and higher productivity of carbon fiber composite materials, particularly in automobile, aviation, and aerospace applications. The properties of composite materials are due largely to the properties of their carbon fibers. The demand is also increasing for higher strength and higher productivity of carbon fibers.

Among others, carbon fibers made from polyacrylonitrile fibers serving as precursor fibers have higher tensile strength than carbon fibers made from other fibers serving as precursor fibers, and thus are often used in composite materials to achieve high performance. To provide a high-strength and high-grade carbon fiber bundle, a polyacrylonitrile fiber bundle serving as the precursor fibers is to have a high grade and be free from filament breakage or fuzzy fibers.

In manufacturing processes for such carbon fibers, fiber bundles may be opened excessively during an oxidization process and a carbonization process. The resulting carbon fiber bundles may have varying physical properties resulting from winding of a produced fiber bundle on a roller or adjacent fiber bundles interfering with each other. To avoid this, the precursor fiber bundle is also to have a high grade and sufficient convergence properties.

Various attempts have been made to achieve a well-convergent precursor fiber bundle with high convergence properties. For example, Patent Literatures 1 and 2 describe interlace performed by applying a fluid to a precursor fiber bundle. However, the methods described in Patent Literatures 1 and 2 use a high-pressure fluid for the interlace, which may damage the precursor fiber bundle and produce the resultant carbon fiber bundle with an insufficient strength and grade.

Patent Literatures 3 and 4 describe interlace methods that use a relatively low-pressure fluid. However, the methods in Patent Literatures 3 and 4 may cause insufficient fiber convergence properties particularly in a fiber bundle including a large number of filaments.

Thus, precursor fiber bundles for carbon fibers are to be developed to make high-strength carbon fiber bundles having a high grade and sufficient convergence properties with high productivity.

CITATION LIST

Patent Literature

Patent Literature 1: Japanese Unexamined Patent Application Publication No. 2017-137602
Patent Literature 2: Japanese Unexamined Patent Application Publication No. 2014-141760
Patent Literature 3: Japanese Patent No. 5100758
Patent Literature 4: Japanese Patent No. 5264150

SUMMARY OF INVENTION

Technical Problems

One or more aspects of the present invention are directed to a method for manufacturing a precursor fiber bundle used in manufacturing a high-strength carbon fiber bundle with high productivity, a method for manufacturing a high-strength and high-grade carbon fiber bundle with high productivity, and a high-strength and high-grade carbon fiber bundle with high productivity.

Solution to Problems

A method for manufacturing a precursor fiber bundle according to an aspect of the present invention includes spinning by extruding a spinning solution through a spinneret to produce a coagulated fiber bundle, and interlacing the coagulated fiber bundle by applying a fluid onto the coagulated fiber bundle. The interlacing includes applying the fluid under a pressure in a range of 0.01 to 0.05 MPa onto the coagulated fiber bundle with a moisture content in a range of 25 to 50% under a tension of 0.02 g/dtex or less.

A method for manufacturing a carbon fiber bundle according to another aspect of the present invention is a method for manufacturing a carbon fiber bundle from a precursor fiber bundle. The precursor fiber bundle is manufactured with the method according to the above aspect.

A carbon fiber bundle according to still another aspect of the present invention includes a fiber bundle including at least 30,000 filaments. The filaments each have a roundness of at least 0.9, a diameter in a range of 4.8 to 6.5 μm, and a tensile strength of at least 5,600 MPa.

Advantageous Effects of Invention

The method for manufacturing a precursor fiber bundle according to the above aspect of the present invention provides precursor fiber bundles that provide high-grade carbon fiber bundles allowing high productivity and having high strength with less yarn bundle divides in the fiber bundles.

The method for manufacturing a carbon fiber bundle according to the above other aspect of the present invention provides high-grade carbon fiber bundles allowing high productivity and having high strength with less yarn bundle divide in the fiber bundles.

The carbon fiber bundle according to the above other aspect of the present invention allows a composite material to have a tensile strength of a high percentage of a tensile strength of a strand. Thus, the carbon fiber bundle according to the above other aspect of the present invention provides a higher-performance composite material.

DESCRIPTION OF EMBODIMENTS

Overview

A method for manufacturing a precursor fiber bundle according to one embodiment includes a spinning process of extruding a spinning solution through a spinneret to produce a coagulated fiber bundle, and an interlacing process of interlacing the coagulated fiber bundle by applying a fluid onto it. In the interlacing process, the fluid is applied under a pressure in the range of 0.01 to 0.05 MPa onto the coagulated fiber bundle under a tension of 0.02 g/dtex or less with a moisture content in the range of 25 to 50%.

With the method for manufacturing a precursor fiber bundle according to the embodiment, the coagulated fiber bundle may include at least 30,000 coagulated fibers for better productivity.

With the method for manufacturing a precursor fiber bundle according to the embodiment, the coagulated fiber bundle may be extruded through one spinneret in the spinning process. The spinning of a fiber bundle through one spinneret has less yarn bundle divides in the resultant precursor fiber bundle and carbon fiber bundle.

A method for manufacturing a carbon fiber bundle according to one embodiment is a method for manufacturing a carbon fiber bundle from a precursor fiber bundle manufactured with the above method.

A carbon fiber bundle according to one embodiment is a fiber bundle including at least 30,000 filaments. The filaments have a roundness of at least 0.9, a diameter in the range of 4.8 to 6.5 μm, and a tensile strength of at least 5,600 MPa. The carbon fiber bundle allows a composite material to have a high conversion percentage of tensile strength relative to the strand. Thus, the carbon fiber bundle provides a high-performance composite material.

The carbon fiber bundle according to the embodiment may have a yarn bundle divided rate of 2% or less measured with the method described below. Fiber bundles with a lower yarn bundle divided rate can be handled easily and can provide a higher-performance carbon fiber reinforced composite material.

The yarn bundle divided rate is determined as described below. A 13 mm-diameter round metal bar is passed through a U-shaped carbon fiber bundle having a 300-g weight attached to its lower ends, and a 140-mm drop test is repeated three times. The carbon fiber bundle after the drop tests, excluding the part contacted with the round metal bar, then undergoes image analysis to measure the area of a slit formed due to yarn bundle divides and the area of a strand portion. The percentage of the area of the slit due to the yarn bundle divides in the area of the strand portion is determined as a yarn bundle divided rate.

The carbon fiber bundle according to the embodiment may provide a composite material having the tensile strength of 90% or more of the tensile strength conversion of the strand. A carbon fiber bundle having such a higher conversion percentage of tensile strength provides a higher-strength composite material.

A carbon fiber bundle is manufactured from a precursor fiber bundle. Carbon fiber bundle manufacturing processes include upstream processes for manufacturing a precursor fiber bundle and downstream processes for manufacturing a carbon fiber bundle from the precursor fiber bundle. The upstream processes and the downstream processes may be performed collectively (in series) or separately. For separate execution, the precursor fiber bundle is stored on a bobbin or in a carton, and the stored precursor fiber bundle is used in the downstream processes.

Carbon fiber bundle manufacturing that uses a polyacrylonitrile fiber bundle as the precursor fiber bundle will now be described.

Upstream Processes

1. Overview

In one or more embodiments of the present invention, a precursor fiber bundle is manufactured through at least a spinning process and an interlacing process.

In addition to the spinning process and the interlacing process, the method for manufacturing a precursor fiber bundle may also include other processes as appropriate, such as a polymerization process for producing a polyacrylonitrile (PAN) polymer, a spinning solution preparation process for preparing a spinning solution, a washing and stretching process for repeatedly washing and stretching a coagulated fiber bundle, an oiling process for applying an oiling agent to a stretched coagulated fiber bundle, a drying and densification process for drying and densifying an oiled coagulated fiber bundle, a stretching process for further stretching a dried and densified coagulated fiber bundle, and a water application process for applying water to a stretched coagulated fiber bundle. The processes will now be described.

2. Processes (1) Polymerization Process

Any known polyacrylonitrile polymer may be used as a raw material for the polyacrylonitrile fiber bundle. The polyacrylonitrile polymer is made from a monomer or monomers that may contain 90 wt % or more, and more specifically, 95 to 99 wt % of acrylonitrile, by homopolymerization or copolymerization of such monomers.

The polyacrylonitrile polymer may be a copolymer containing a 90 to 99 wt % acrylonitrile monomer and a 1 to 10 wt % comonomer copolymerizable with acrylonitrile having a vinyl backbone.

Examples of the comonomer copolymerizable with acrylonitrile include acids such as acrylic acid and itaconic acid, and their salts, esters such as methyl acrylate, ethyl acrylate, and methyl methacrylate, and amides such as acrylamide, of which one or a combination of two or more may be used depending on the intended fiber characteristics.

The polyacrylonitrile polymer may result from any known polymerization such as solution, suspension, or emulsion polymerization. The polymerization catalyst used for the polymerization reaction may be any appropriate known catalyst depending on the polymerization. Examples of the catalyst include radical polymerization catalysts such as azo compounds and peroxides, and redox catalysts. For redox catalysts, examples of their reducing agents include sodium bisulfite, ammonium bisulfite, alkyl mercaptans, and ascorbic acid, whereas examples of the oxidizing agents include potassium persulfate, sodium persulfate, ammonium persulfate, sodium chlorite, and hydrogen peroxide.

(2) Spinning Solution Preparation Process

The method for manufacturing a precursor fiber bundle may have spinning from a spinning solution dissolving the above polyacrylonitrile polymer in a solvent. Any known solvent may be used for the spinning solution, such as an aqueous solution of zinc chloride, sodium thiocyanate, or another inorganic compound or an organic solvent such as dimethylacetamide, dimethylsulfoxide, or dimethylformamide. The solvent used for the spinning solution may or may not be the solvent used in the polymerization process. For the polymerization process having solution polymerization or other polymerization that produces a polymer solution with a polymer dissolved in a solvent, the polymer solution may be used as a spinning solution without precipitation of the polymer.

Although the spinning solution may have any polymer concentration, the quantity of the solvent is adjusted to have the polymer concentration of 3 to 40 wt %, specifically 4 to 30 wt %, and more specifically 5 to 25 wt %. These ranges of polymer concentrations achieve a spinning solution that allows easy spinning and provides internally dense coagulated fibers. An increase in the polymer concentration improves the internal denseness of the coagulated fibers produced in the spinning process, thus achieving precursor fibers to be carbon fibers having high strength. An excessive polymer concentration may increase the viscosity of the spinning solution and reduce the spinning stability.

(3) Spinning Process

The resulting spinning solution is spun through a spinneret and coagulated using a known spinning method to produce a coagulated fiber bundle. The spinning method may be any method appropriate to the type of the solvent used, such as dry spinning, which coagulates the spinning solution in a gas phase, or wet spinning, which coagulates the spinning solution in a coagulation solution. In this example, wet spinning is used. Wet spinning is divided into wet spinning and dry-wet spinning. In wet spinning, the spinneret is immersed in a coagulation bath, and the spinning solution is spun and coagulated. In dry-wet spinning, the spinneret is placed above the surface of the solution in a coagulation bath, and the spinning solution is spun and passed through the gas phase between the spinneret and the surface of the coagulation solution and then fed into the coagulation solution for coagulation. Of the two usable methods, wet spinning may be used, in which the spinneret is immersed in the coagulation bath, and the spinning solution is spun and coagulated. Wet spinning, in which the spinneret is immersed in the coagulation bath, and the spinning solution is spun and coagulated, easily provides a precursor fiber bundle and a carbon fiber bundle with a surface having wrinkles.

In wet spinning, the coagulation solution may be an aqueous solution prepared by dissolving in water, a solvent capable of dissolving a polyacrylonitrile polymer. Although the solvent contained in the coagulation solution may be any one of the above-listed solvents usable for the spinning solution, the solvent may be the same as the solvent for the spinning solution used. The coagulation bath may have any solvent concentration and temperature. For coagulability and spinning stability, the solvent concentration may be 10 to 70 wt % and specifically 15 to 40 wt %, whereas the temperature may be 0 to 60° C. and specifically 3 to 50° C. As the solvent concentration in the coagulation bath increases or the temperature decreases, the roundness of the resulting precursor fiber bundle and carbon fiber bundle tends to increase.

The spinneret through which the spinning solution is extruded may have, but is not limited to, 20,000 or more spinning holes and specifically 30,000 or more spinning holes. More specifically, the spinneret may have 30,000 to 100,000 spinning holes and specifically 35,000 to 80,000 spinning holes. The number of spinning holes specifies the number of filaments of the coagulated fiber bundle to be produced. The spinning holes may have a pore size (also referred to as a spinneret diameter) of 0.02 to 0.5 mm and specifically 0.03 to 0.4 mm. The pore size of 0.02 mm or more reduces the possibility of the spun filaments sticking together, thus providing a highly uniform precursor fiber bundle. The pore size of 0.5 mm or less reduces filament breakage, thus allowing the spinning stability to be maintained easily.

(4) Washing and Stretching Process

The coagulated fiber bundle obtained in the spinning process may be washed and stretched in water or a solution including solvent. The stretch ratio may be 3 to 15 to increase the throughput yield and productivity. The washing and stretching may be repeated multiple (desirably five or more) times. To distinguish the stretching from the downstream stretching process described later, the stretching in the current process may be referred to as the upstream stretching.

(5) Oiling Process

An oiling agent may be applied to the coagulated fiber bundle after the washing and stretching process. Although the oiling agent may be applied in any appropriate manner, the coagulated fiber bundle is immersed into an oil-containing aqueous solution to place the fiber surface into contact with the oiling agent. The oiling agent may be basically a silicone oil agent for sticking of filaments, heat resistance, and throughput yield.

The silicone oil agent may be amino-modified silicone, epoxy-modified silicone, or ether-modified silicone or a mixture of two or more of these.

The quantity of the applied oil agent may be 0.01 to 10 wt %, specifically 0.03 to 5 wt %, and more specifically 0.04 to 1 wt %. The applied oil agent in quantities in these ranges reduces filament breakage and fuzzy fibers during the subsequent processes and the downstream processes, achieving a high-grade polyacrylonitrile fiber bundle and a carbon fiber bundle with high grade.

(6) Drying and Densification Process

The coagulated fiber bundle after the oiling process may be dried and densified at 70 to 200° C. In the drying and densification, the fiber bundle may be heated using a heated roller with a surface temperature of 70 to 200° C. The drying duration may be one to ten minutes.

(7) (Downstream) Stretching Process

The coagulated fiber bundle having the oiling agent applied or the coagulated fiber bundle after the drying and densification process may be stretched further (downstream stretching). Although the downstream stretching process may have any appropriate stretching method, steam stretching is desirable. The steam stretching may have a saturated steam pressure of 0.01 to 0.5 MPa (absolute pressure) and specifically 0.05 to 0.4 MPa.

The stretch ratio in the steam stretching may be 1.2 to 10, specifically 1.8 to 8, and more specifically 2 to 7. The temperature in the steam stretching may be 105 to 180° C. and specifically 110 to 160° C.

The total stretch ratio through the upstream stretching, drying, and downstream stretching may be 5 to 20 and specifically 10 to 17. The linear density after the steam stretching may be 0.5 to 2 dtex.

The coagulated fiber bundle after the steam stretching may also be heat-treated with a heated roller having a surface temperature of 100 to 200° C.

(8) Water Application Process

Water may be applied to the coagulated fiber bundle after the downstream stretching process to allow the coagulated fiber bundle to have a moisture content of 20 to 50%. The moisture content may be 25 to 45% and specifically 25 to 35%. Water may be applied by, for example, immersing the coagulated fiber bundle into the water or spraying water onto the coagulated fiber bundle.

(9) Interlacing Step (Interlace Process)

The coagulated fiber bundle after the water application is interlaced. The interlacing step is performed with the coagulated fiber bundle under a tension of 0.02 g/dtex or less. The interlacing step may be performed with the coagulated fiber bundle under a tension of 0.001 to 0.015 g/dtex and specifically 0.005 to 0.01 g/dtex. The tension may be adjusted through, for example, upstream and downstream rollers in the interlacing process.

Figure 1:
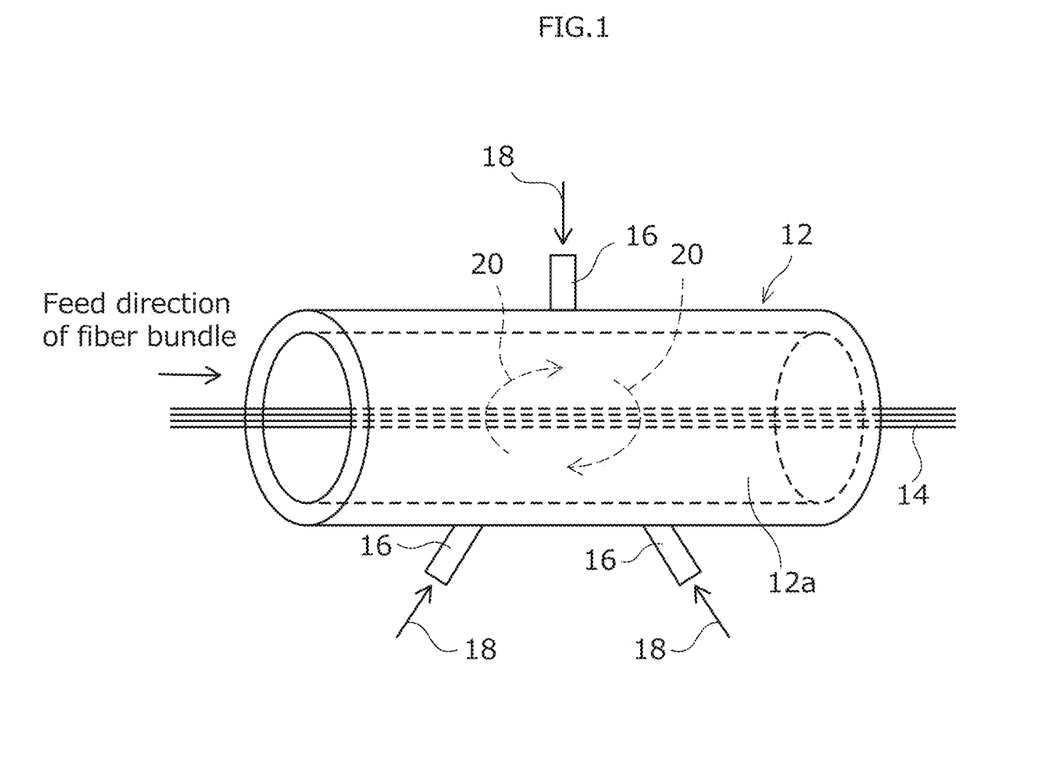
FIG. 1 is a diagram describing an interlace process in a method for manufacturing a precursor fiber bundle.

The interlacing step may be performed using, for example, an interlace device having an air jet hole. An interlace device 12, as shown in FIG. 1, includes a cylindrical main body 12a that forms an interlacing nozzle. A coagulated fiber bundle 14 is passed through the cylindrical main body 12a. The interlace device 12 includes multiple (for example, three) pressurized-air feed ports 16 formed through the cylindrical main body 12a. The pressurized-air feed ports 16 allow pressurized air 18 to be fed into the cylindrical main body 12a. The fed pressurized air produces an airflow 20 in the cylindrical main body 12a. The pressurized air may be blown with gauge pressures maintained at 0.01 to 0.05 MPa and specifically 0.02 to 0.04 MPa.

The coagulated fiber bundle may be interlaced after the spinning process, specifically after the downstream stretching process and before the oxidization process, and more specifically after the water application process.

The coagulated fiber bundle after the water application process is a precursor fiber bundle without other processes (processing) for serving as a precursor fiber bundle. The coagulated fiber bundle may be interlaced to produce a precursor fiber bundle of consistent grade. The coagulated fiber bundle after the water application process has a diameter substantially equal to the diameter of the precursor fiber bundle, allowing the interlace device to be small.

The coagulated fiber bundle undergoing the interlacing process may include at least 30,000 coagulated fibers. The interlacing step according to one or more embodiments of the present invention forms a precursor fiber bundle with high convergence properties from a coagulated fiber bundle including a larger number of filaments. A coagulated fiber bundle including a large number of filaments enables a precursor fiber bundle and a carbon fiber bundle to be produced with high productivity.

Although the coagulated fiber bundle undergoing the interlacing process may be one coagulated fiber bundle spun through one spinneret or a single coagulated fiber bundle spun through two or more spinnerets, a coagulated fiber bundle spun through one spinneret may be specifically used. One coagulated fiber bundle spun through one spinneret reduces the yarn bundle divides in the precursor fiber bundle and the carbon fiber bundle. A single coagulated fiber bundle spun through two or more spinnerets may be doubled before undergoing the interlacing process.

The above method for manufacturing a polyacrylonitrile fiber bundle (precursor fiber bundle) provides precursor fiber bundles that provide high-grade carbon fiber bundles allowing high productivity and having high strength with less filament breakage in the fiber bundles.

Additionally, the precursor fiber bundles provide carbon fiber bundles with less fuzzy fibers. More specifically, when the precursor fiber bundles are used to manufacture carbon fiber bundles (in the downstream processes), the carbon fiber bundles are obtained in a stable manufacturing process with less fiber bundle breakage and less filament breakage.

In manufacturing composite materials from the carbon fiber bundles, when the carbon fiber bundles are opened to improve impregnation with resin, the carbon fiber bundles have less yarn bundle divides. The composite materials can have the tensile strength of 90% or more of the tensile strength of the carbon fiber.

The total linear density of each precursor fiber bundle may be 2,000 to 7,000 tex and specifically 2,500 to 6,000 tex to increase the strength of the resultant carbon fiber bundle. The filament diameter of the precursor fiber bundle may be 7 to 12 μm and specifically 8 to 11 μm.

The use of the resultant polyacrylonitrile fiber bundles as the precursor fiber bundles for a carbon fiber bundle improves the manufacturing throughput yield and the productivity of the carbon fiber bundle.

Downstream Processes

1. Overview

The method for manufacturing a carbon fiber bundle from a precursor fiber bundle (the downstream processes) includes at least an oxidization process and a carbonization process in this order. In addition to the oxidization process and the carbonization process, the downstream processes may also include other processes as appropriate, such as a surface-treatment process for improving the surface of the carbonized fiber and a sizing process for applying (adding) a sizing agent to the carbonized fiber. Additionally, the method may include a graphitization process following the carbonization process. The processes will now be described.

2. Processes (1) Oxidization Process

The precursor fiber bundle is oxidized in heated air at 200 to 280° C. The oxidization causes a cyclization reaction in the precursor fiber molecules, increasing oxygen bonds. The precursor fiber bundle becomes infusible and flame-retarded, providing acrylic oxidized fibers (OPF).

The oxidization process may include a pre-oxidization process for performing oxidization in an upstream area in the feeding direction of the precursor fiber bundle (near the end at which the precursor fiber bundle is processed first) at lower temperatures in the above temperature range, and a main oxidization process for performing oxidization in a downstream area at higher temperatures in the above temperature range. The pre-oxidization process facilitates the cyclization reaction further.

The precursor fiber bundle may be oxidized while being stretched at a stretch ratio of 0.9 to 1.2. More specifically, the stretch ratio in the pre-oxidization process may be 1.0 to 1.2, and the stretch ratio in the main oxidization process may be 0.9 to 1.1.

The oxidization may be continued until the density of the oxidized fiber bundle reaches 1.34 to 1.38 g/cm$^3$. The oxidized fiber bundle having a density in the range provides a carbon fiber bundle with higher strength.

(2) Carbonization Process

The oxidized fiber bundle is carbonized in an inert atmosphere at a maximum temperature of 300 to 1,800° C. The carbonization process may include a first carbonization process in an upstream area with a maximum temperature of 300 to 800° C., and a second carbonization process in a downstream area with a maximum temperature of 500 to 1,800° C. The separate processes facilitate the carbonization. Additionally, the carbonization process may include a third carbonization process with a maximum temperature higher than in the second carbonization process.

The carbonization may be performed with the fiber bundle under tension. More specifically, a tension of 50 to 200 mg/dtex may be applied during the first carbonization process, and a tension of 200 to 1,000 mg/dtex may be applied during the second carbonization process. The application of tension in these ranges provides a carbon fiber bundle with higher strength.

The carbonized fiber bundle may have a density of 1.77 to 1.82 g/cm$^3$. The fiber bundle may have a fiber diameter of 4.8 to 6.5 μm. The fiber bundle may have an X-ray measured crystallite size (Lc) of 20 Å or less, and an X-ray measured degree of crystal orientation of 81% or more.

(3) Surface-Treatment Process

The carbonized fiber bundle undergoes surface oxidation in a gas phase or a liquid phase. For productivity and ease of process control, liquid-phase treatment is desirable. In particular, the liquid-phase treatment may be electrolytic treatment with an electrolytic solution for the liquid safety and stability.

(4) Sizing Process

The surface-treated fiber bundle undergoes sizing as appropriate. The sizing process may be performed using a known method, and with any known sizing agent appropriate for use. After being applied uniformly, the sizing agent may be dried.

The downstream processes, or the processes for manufacturing a carbon fiber bundle from a precursor fiber bundle, provide high productivity with less process trouble such as fiber bundle breakage. The resultant high-grade carbon fiber bundle has less filament breakage and is less fuzzy.

The carbon fiber produced through the upstream and downstream processes may have a roundness of at least 0.9 and specifically 0.94 to 0.96, and also include a surface with wrinkles. The use of the carbon fiber bundle as a reinforcement fiber bundle provides a high-performance composite material.

3. Composite Material

The carbon fiber bundle manufactured using the above method may be combined with a resin material to produce a composite material. Even when being opened to improve impregnation with resin, the carbon fiber bundle manufactured as described above is less likely to have yarn bundle divides, thus providing a high-performance composite material.

The carbon fiber bundle manufactured using the above method has good openability, providing a composite material having the tensile strength of 90% or more of the tensile strength conversion of the carbon fibers. The conversion percentage of tensile strength of the composite material relative to the carbon fibers will be referred to as the 0-TS conversion percentage.

EXAMPLES

One or more embodiments of the present invention will now be described using examples and comparative examples. Processing conditions and methods for evaluating the physical properties of precursor fibers, oxidized fibers, and carbon fibers in the examples and comparative examples are described below.

Method for Measuring Moisture Content of Coagulated Fiber Bundle

The moisture content of a coagulated fiber bundle was measured as described below. About 5 g of the coagulated fiber bundle immediately before undergoing the interlacing process was extracted, dried at 105° C. for two hours, and allowed to cool in a desiccator. Then, the loss in weight was calculated based on the equation below as the quantity of water contained in the fiber bundle. The moisture content was measured by determining the average of values from five extracted samples.

Moisture content=$(a-b)/b \times 100 (\%)$ a: fiber weight before drying (g)
b: fiber weight after drying (g)

Method for Measuring Strand Strength and Elastic Modulus of Carbon Fiber Impregnated with Resin Measurements were performed with the method defined in JIS R 7608.

Crystallite Size and Degree of Orientation

An X-ray diffractometer RINT2000 manufactured by Rigaku Corporation was used to calculate a crystallite size Lc from the half width β of a diffraction peak of Miller indices (002) with a transmission method based on the equation below:

Crystallite size $Lc$ (nm)=$0.9\lambda/\beta \cos \theta$

λ: X-ray wavelength, β: half width, and θ: diffraction angle

In addition, the half widths $H_{1/2}$ and $H'_{1/2}$ of two peaks (derived from the intensity distribution) obtained by circumferential scanning at the diffraction peak angle were used to calculate the degree of crystal orientation based on the equation below.

Degree of crystal orientation (%)=$100 \times [360-(H_{1/2}-H'_{1/2})]/360$ $H_{1/2}$ and $H'_{1/2}$: half widths Carbon Fiber Surfaces with Wrinkles For carbon fiber surfaces with wrinkles, a measurement sample was prepared by placing carbon fibers for measurement on a stainless steel disc for measurement and fixing both sample ends to the disc. Observation was conducted with a scanning probe microscope (SPM NanoscopeIII manufactured by DI).

Roundness

A carbon fiber bundle is sampled and cut with a razor in a direction vertical to the fiber axis. The cross-sectional shape of a filament is observed with an optical microscope. The measurement is performed with a magnification power of 200 to 400 to allow the thinnest filament to be observed to have a thickness of about 1 mm, and the device used is assumed to have a resolution of 2,000,000 pixels. The resultant image undergoes image analysis to determine the cross-sectional area and the perimeter of a filament of the carbon fiber bundle. Based on the cross-sectional area, the cross-sectional diameter (filament diameter) of the filament assumed to be round is calculated and expressed in tenths of a micrometer, and the roundness of the filament of the carbon fiber bundle is determined based on the equation below. The roundness is calculated by determining the average of values from ten randomly selected filaments.

Roundness=$4\pi S/C^2$ where S denotes the cross-sectional area of a filament of the carbon fiber bundle, and C denotes the perimeter of the filament.

Method for Evaluating Grade

The carbon fiber bundle was run at a rate of 50 feet/min for 2 min between urethane sheets on which a 125-g weight was placed, and the quantity of carbon fibers left on the urethane sheets was measured. When the quantity of carbon fibers left on the urethane sheets was 40 µg/ft or less, the fuzzy fiber grade was determined to be good.

Yarn Bundle Divided Rate

Yarn bundle divides were evaluated by repeating a 140-mm drop test three times, with a 500-g weight attached to the lower ends of a U-shaped carbon fiber bundle, through which a 13-mm-diameter round metal bar was passed, and observing the area of a slit in the carbon fiber bundle and the area of a strand portion.

In other words, a sample was produced by preparing a 500-g rectangular solid weight that has a pair of opposite surfaces being 30 mm apart from each other, and fixing the ends of a single carbon fiber bundle bent into a U shape to the pair of the opposite surfaces of the weight to have a distance of 140 mm between the U-curved end (return bend) and the weight. A 13-mm-diameter round metal bar having a mirror surface was passed under the sample carbon fiber bundle, and a 140-mm weight drop test on the round metal bar was repeated three times. Then, an 80-mm fiber bundle portion other than the parts fixed to the weight and the part contacted with the round metal bar (middle part) was cut from the carbon fiber bundle, placed on a sheet of white paper, and imaged with a camera. The captured image was analyzed to quantify the area of the slit and the area of the strand portion. An evaluation was then performed based on the ratio of the area of the slit to the area of the strand portion.

The evaluation will now be described in detail with reference to FIGS. 2 to 3C.

Figure 2:
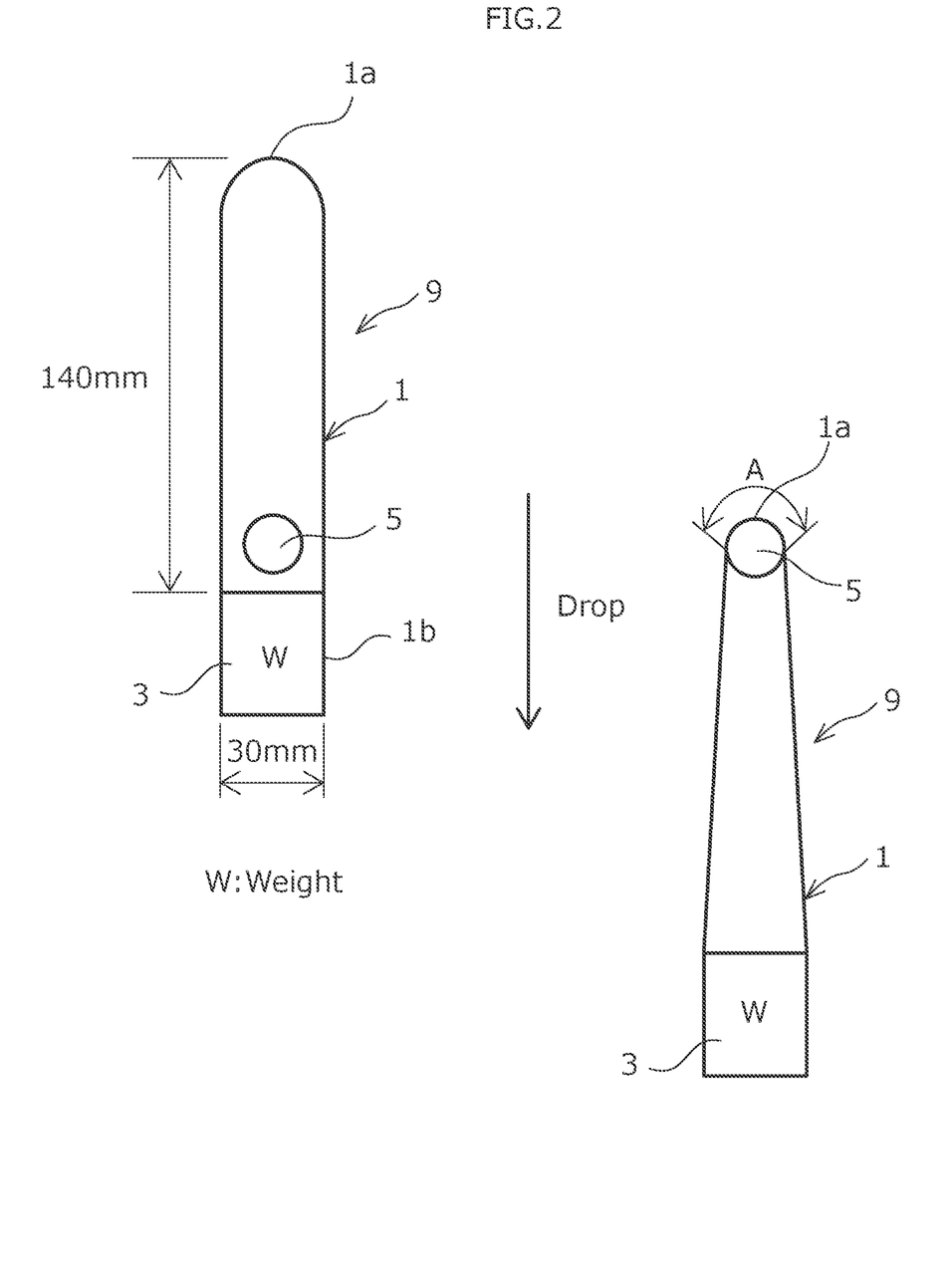
FIG. 2 is a diagram describing a method for evaluating yarn bundle divides.

As shown in FIG. 2, a sample 9 is produced by bending one carbon fiber bundle 1 (with a full length of 300 mm) at its middle into a U shape, and fixing the carbon fiber bundle 1 at its ends 1b to a weight 3 to have a distance of 140 mm between the weight 3 and a return bend 1a. The weight 3 has a weight of 500 g, and the weight opposite surfaces fixed to the ends 1b of the carbon fiber bundle 1 are 30 mm apart from each other.

A round metal bar 5 is passed through the inner space of the sample carbon fiber bundle 1, and the weight 3 of the sample 9 is supported with the round metal bar 5 in contact with the weight 3. The round metal bar 5 has a diameter of 13 mm and includes a mirror surface.

In this state, the support of the weight 3 is released to drop the sample 9. As a result, the middle part of the carbon fiber bundle 1 including the return bend 1a is supported by the round metal bar 5, and the sample 9 is hung on the round metal bar 5. This drop test was performed three times in total.

Figure 3A:
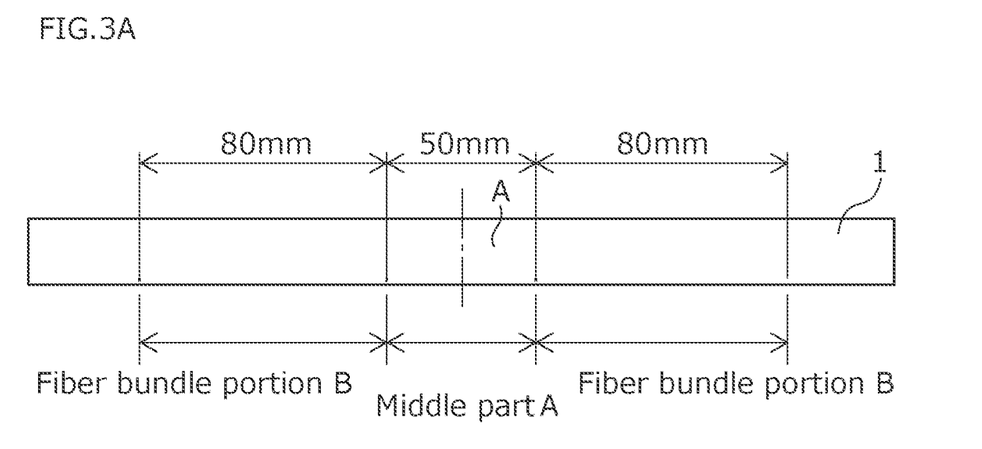
FIGS. 3A to 3C are diagrams describing a method for evaluating yarn bundle divides.

Then, the parts of the carbon fiber bundle 1 fixed to the weight 3 are removed, and as shown in FIG. 3A, the carbon fiber bundle 1 is straightened. To prevent light reflection from a mark due to direct hits by the round metal bar 5, a middle part A that is 50 mm across is excluded. An 80-mm section from the excluded site is cut from the carbon fiber bundle 1 as a fiber bundle portion B, which is then imaged with the camera and undergoing image analysis.

Figure 3B:
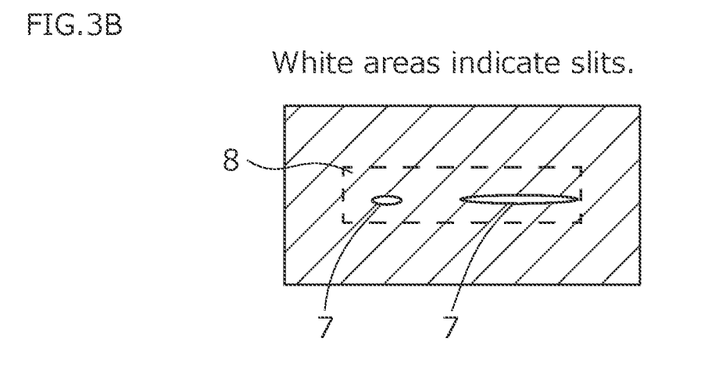

More specifically, to calculate the area of slits 7 in the fiber bundle portion B, as shown in FIG. 3B, the slits (yarn bundle divides) 7 and a strand portion 8 were set distinguishable from each other, and image processing software A-image kun (registered trademark, manufactured by Asahi Kasei Engineering Corporation) was used to perform image processing in the analysis mode set at particle analysis conditions.

The image processing was performed with the particle brightness set at Bright, the binarization threshold at 50 between 0 and 255, and a noise elimination filter in active use.

Figure 3C:
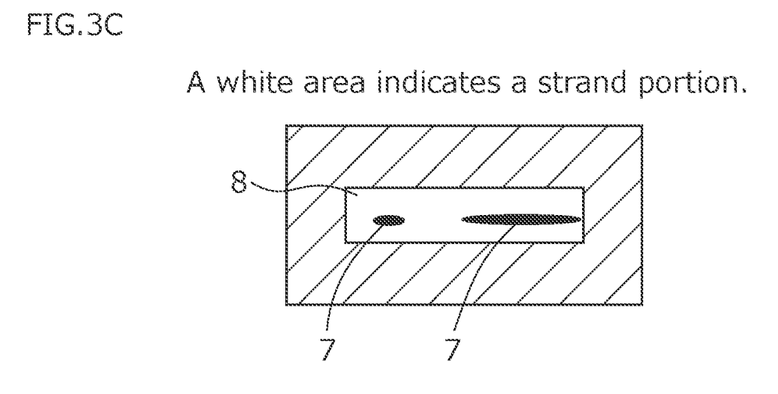

To calculate the area of the strand portion 8, as shown in FIG. 3C, the boundary of the strand portion 8 was set distinguishable, and image processing was performed in a manner similar to the calculation of the area of the slits 7. The image processing was performed with the particle brightness set at Dark.

The areas calculated in the image processing were used to determine the yarn bundle divided rate based on the equation below.

Yarn bundle divided rate=slit area/strand portion area×100

When the yarn bundle divided rate was 2% or less, the yarn bundle divides were determined to be good. In the examples, the above analysis was performed ten times, and the average value was evaluated.

O-TS Conversion Percentage

Resin Composition

Components

| Epoxy resins | |
|---|---|
| MY0600: glycidyl amine epoxy resin, Araldite MY0600 (trade name) manufactured by Huntsman Advanced Materials GmbH | 35 parts by weight |
| EP604: glycidyl amine epoxy resin, EP604 (trade name) manufactured by Japan Epoxy Resin Co., Ltd. | 30 parts by weight |
| EP828: bisphenol A epoxy resin, EP828 (trade name) manufactured by Japan Epoxy Resin Co., Ltd. | 15 parts by weight |
| EPU-6: urethane-modified epoxy resin, EPU-6 (trade name) manufactured by ADEKA Corporation | 20 parts by weight |
| Aromatic amine curing agent: 4,4'-diaminodiphenyl sulfone (SEIKACURE-S (trade name) manufactured by Wakayama Seika Kogyo Co., Ltd.) | 40 parts by weight |
| Polyethersulfone: PES-5003P (trade name) manufactured by Sumitomo Chemical Industry Co., Ltd. | 35 parts by weight |
| Polyamide resin particles: Grilamid TR 55 (trade name) manufactured by EMS- CHEMIE (Japan) Ltd. | 20 parts by weight |

Preparation of Resin Composition

The polyethersulfone was added to the epoxy resins, and the mixture was stirred at 120° C. for 60 min using a planetary mixer to completely dissolve the polyethersulfone in the epoxy resins. The resin temperature was allowed to cool to 80° C. or less, and then the polyamide resin particles and the curing agent were added. The mixture was kneaded with a roll mill to prepare an epoxy resin composition.

Production of Prepreg

The prepared epoxy resin composition was applied onto release paper with a film coater to form two 50-g/m² resin films. Then, the resultant resin films were laid on both sides of a carbon fiber sheet including carbon fiber bundles arranged unidirectionally. The resin was impregnated into the carbon fiber sheet by heating and pressurization to produce a unidirectional prepreg including carbon fibers with an area weight of 190 g/m² and a matrix resin with a resin content of 35.0%.

0° Tensile Strength (0-TS)

Multiple layers of the produced unidirectional prepreg were laminated to have a thickness of 1 mm in total, and then cured at 180° C. to produce a fiber reinforced composite material. This material underwent a tensile test at room temperature in accordance with ASTM D 303. The resultant strength was defined as a tensile strength of 0°, and the strength conversion percentage (0-TS conversion) was calculated based on the equation below.

0-TS conversion percentage=0-TS/(TS×$V_f$)

where 0-TS: tensile strength of 0° (MPa)
TS: strand tensile strength (MPa)
$V_f$: carbon fiber content by volume of fiber reinforced composite material

Example 1

A spinning solution was spun into a 25 wt % zinc chloride aqueous solution (coagulation solution) through a spinneret having 36,000 spinning holes per spinneret. This produced a coagulated fiber bundle continuously. The spinning solution was a zinc chloride aqueous solution in which a 7 wt % copolymer containing 95 wt % acrylonitrile, 4 wt % methyl acrylate, and 1 wt % itaconic acid was dissolved.

The coagulated fiber bundle was washed and stretched, oiled, dried and densified, and downstream-stretched, and then water was applied (jetted) to the coagulated fiber bundle to allow the moisture content to be 30%.

Then, the coagulated fiber bundle with a moisture content of 30% under a tension of 0.011 g/dtex was passed through an interlace device blowing pressurized air with a gauge pressure of 0.035 MPa. This process produced a precursor fiber bundle having a filament diameter (diameter) of 8.3 μm, a fiber bundle linear density of 2,300 tex, and 36,000 filaments.

The precursor fiber bundle underwent pre-oxidation at 230 to 260° C. with a stretch ratio of 1.04, followed by main oxidization at 240 to 270° C. with a stretch ratio of 1.0. The oxidized PAN fiber bundle (OPF, or flame-resistant fiber bundle) had a specific weight (OPF specific weight) of 1.36 g/cm³.

The resultant oxidized fiber bundle was fed into a first carbonization furnace with the maximum temperature set at 600° C. and then passed through a second carbonization furnace with the maximum temperature set at 1,500° C. The second carbonization furnace has an inlet temperature set at 700° C. A tension of 146 mg/dtex was applied in the first carbonization furnace, and a tension of 487 mg/dtex was applied in the second carbonization furnace.

The fiber bundle passed through the second carbonization furnace was surface-treated using an ammonium sulfate aqueous solution as an electrolytic solution, and a sizing agent (epoxy resin) was applied and dried.

The resultant carbon fiber bundle produced in this manner had a linear density of 1.2 g/m, a strand tensile strength of 6,200 MPa, a strand tensile modulus of 290 GPa, an X-ray measured crystallite size of 18.1 Å, an X-ray measured degree of crystal orientation of 81.9%, a specific weight of 1.80 g/cm³, and a filament diameter (diameter) of 4.9 μm.

The resultant carbon fibers had a roundness of 0.95, a surface with wrinkles observed, a good fuzzy fiber grade (denoted by Good in Table 1), and a yarn bundle divided rate of 1.2%.

The resultant carbon fiber bundle was used to form a composite material, which had the 0-TS conversion percentage of 92%.

The results are summarized in Table 1.

The specific weight of the oxidized fibers and the roundness of the carbon fibers were the same as in examples 2 to 8 and comparative examples 1 to 4 described later. The surface with wrinkles of the carbon fibers was also observed in each example and each comparative example. These characteristics will not be described repeatedly.

Example 2

The same spinning solution as in example 1 was spun through a spinneret having 48,000 spinning holes per spinneret. A carbon fiber bundle was produced under the same conditions as in example 1 except for a tension of 0.01 g/dtex during the interlacing process.

The resultant carbon fibers had a good fuzzy fiber grade (denoted by Good in the table) and a yarn bundle divided rate of 0.7%.

The resultant carbon fiber bundle was used to form a composite material, which had the 0-TS conversion percentage of 92% (see Table 1). Other characteristics of the precursor fiber bundle and the carbon fiber bundle are listed in Table 1.

Example 3

The same spinning solution as in example 1 was spun through a spinneret having 60,000 spinning holes per spinneret. A carbon fiber bundle was produced under the same conditions in the upstream processes as in example 2 except for 60,000 filaments in the fiber bundle.

The resultant carbon fibers had a good fuzzy fiber grade (denoted by Good in the table) and a yarn bundle divided rate of 0.7%.

The resultant carbon fiber bundle was used to form a composite material, which had the 0-TS conversion percentage of 92% (see Table 1). Other characteristics of the precursor fiber bundle and the carbon fiber bundle are listed in Table 1.

Example 4

The same spinning solution as in example 1 was spun through a spinneret having 36,000 spinning holes per spinneret to allow the resultant precursor fiber bundle to have a filament diameter of 9.6 μm. The upstream processes were the same as in example 2 except for 36,000 filaments in the fiber bundle and the fiber diameter of the precursor fibers being 9.6 μm. The downstream processes were the same as in example 1 except for a tension of 470 mg/dtex during the second carbonization process.

The resultant carbon fibers had a good fuzzy fiber grade (denoted by Good in the table) and a yarn bundle divided rate of 0.8%.

The resultant carbon fiber bundle was used to form a composite material, which had the 0-TS conversion percentage of 92% (see Table 1). Other characteristics of the precursor fiber bundle and the carbon fiber bundle are listed in Table 1.

Example 5

The same spinning solution as in example 1 was spun through a spinneret having 36,000 spinning holes per spinneret to allow the resultant precursor fiber bundle to have a filament diameter of 10.5 μm. The upstream processes were the same as in example 4 except for the fiber diameter of the precursor fibers being 10.5 μm and a moisture content of 40% during interlacing process. The downstream processes were the same as in example 1 except for a tension of 396 mg/dtex during the second carbonization process.

The resultant carbon fibers had a good fuzzy fiber grade (denoted by Good in the table) and a yarn bundle divided rate of 1.5%.

The resultant carbon fiber bundle was used to form a composite material, which had the 0-TS conversion percentage of 92% (see Table 1). Other characteristics of the precursor fiber bundle and the carbon fiber bundle are listed in Table 1.

Example 6

A precursor fiber bundle was produced under the same conditions as in example 5 except for spinning through a spinneret having 48,000 spinning holes per spinneret to form a fiber bundle including 48,000 filaments. The downstream processes were the same as in example 1 except for a tension of 400 mg/dtex during the second carbonization process.

The resultant carbon fibers had a good fuzzy fiber grade (denoted by Good in the table) and a yarn bundle divided rate of 1.5%.

The resultant carbon fiber bundle was used to form a composite material, which had the 0-TS conversion percentage of 90% (see Table 1). Other characteristics of the precursor fiber bundle and the carbon fiber bundle are listed in Table 1.

Comparative Example 1

The same spinning solution as in example 1 was spun through a spinneret having 36,000 spinning holes per spinneret. The upstream processes were the same as in example 4 except that pressurized air in the interlacing process was blown with a gauge pressure of 0.07 MPa. The downstream processes were the same as in example 4.

The resultant carbon fibers had a good fuzzy fiber grade (denoted by Good in the table) and a yarn bundle divided rate of 0.6%.

The resultant carbon fiber bundle was used to form a composite material, which had the 0-TS conversion percentage of 83% (see Table 1). Other characteristics of the precursor fiber bundle and the carbon fiber bundle are listed in Table 1.

Comparative Example 2

The same spinning solution as in example 1 was spun through a spinneret having 36,000 spinning holes per spinneret. The upstream processes were the same as in example 4 except for a moisture content of 60%. The downstream processes were the same as in example 4.

The resultant carbon fibers had a good fuzzy fiber grade (denoted by Good in the table) and a yarn bundle divided rate of 3.1%.

The resultant carbon fiber bundle was used to form a composite material, which had the 0-TS conversion percentage of 85% (see Table 1). Other characteristics of the precursor fiber bundle and the carbon fiber bundle are listed in Table 1.

Comparative Example 3

The same spinning solution as in example 1 was spun through a spinneret having 36,000 spinning holes per spinneret. The upstream processes were the same as in example 4 except for a moisture content of 15%. The downstream processes were the same as in example 4.

The resultant carbon fibers had a good fuzzy fiber grade (denoted by Good in the table) and a yarn bundle divided rate of 0.6%.

The resultant carbon fiber bundle was used to form a composite material, which had the 0-TS conversion percentage of 82% (see Table 1). Other characteristics of the precursor fiber bundle and the carbon fiber bundle are listed in Table 1.

Comparative Example 4

The same spinning solution as in example 1 was spun through a spinneret having 36,000 spinning holes per spinneret. The upstream processes were the same as in example 4 except for a tension of 0.03 g/dtex during the interlacing process. The downstream processes were the same as in example 4.

The resultant carbon fibers had a poor fuzzy fiber grade (denoted by Poor in the table) and a yarn bundle divided rate of 2.6%.

The resultant carbon fiber bundle was used to form a composite material, which had the 0-TS conversion percentage of 85% (see Table 1). Other characteristics of the precursor fiber bundle and the carbon fiber bundle are listed in Table 1. I/L in the table refers to an interlacing process.

TABLE 1

| | | Example 1 | Example 2 | Example 3 | Example 4 | Example 5 | Example 6 | Comparative Example 1 |
|---|---|---|---|---|---|---|---|---|
| Holes in spinneret | No. | 36000 | 48000 | 60000 | 36000 | ← | 48000 | 36000 |
| Spinneret diameter | mm | 0.05 | 0.05 | 0.05 | 0.055 | 0.065 | 0.065 | 0.055 |
| Doubling position | | N/A | ← | ← | ← | ← | ← | ← |
| Moisture content of fiber during I/L | % | 30 | ← | ← | ← | 40 | ← | 30 |
| Tension during I/L | g/dtex | 0.011 | 0.01 | ← | ← | ← | ← | ← |
| I/L pressure | Mpa | 0.035 | ← | ← | ← | ← | ← | 0.07 |
| Precursor fiber bundle linear density | tex | 2300 | 3100 | 3900 | 3100 | 3700 | 4900 | 3100 |
| Precursor fiber diameter | μm | 8.3 | ← | ← | 9.6 | 10.5 | ← | 9.6 |
| Second carbonization furnace tension | mg/dtex | 487 | ← | ← | 470 | 396 | 400 | 470 |
| Carbon fiber bundle linear density | g/m | 1.2 | 1.7 | 2.1 | 1.7 | 2.0 | 2.6 | 1.7 |
| Strand tensile strength | MPa | 6200 | ← | ← | 6000 | 5700 | ← | 5500 |

TABLE 1-continued

| | | | | | | | | |
|---|---|---|---|---|---|---|---|---|
| Strand tensile modulus | GPa | 290 | ← | ← | ← | 285 | ← | 290 |
| X-ray measured crystallite size (Lc) | Å | 18.1 | 18.1 | 18.1 | 18.5 | ← | ← | 18.5 |
| X-ray measured degree of crystal orientation | % | 81.9 | 81.9 | 81.9 | 81.6 | 81.6 | 81.3 | 81.6 |
| Specific weight | g/cm³ | 1.80 | ← | ← | ← | ← | ← | 1.8 |
| Fiber diameter | μm | 4.9 | 5.0 | 4.9 | 5.7 | 6.2 | 6.2 | 5.7 |
| CF fuzzy fiber grade | Good/Poor | Good | ← | ← | ← | ← | ← | ← |
| Bundle divided rate | % | 1.2 | 0.7 | 0.7 | 0.8 | 1.5 | 1.5 | 0.6 |
| 0-TS conversion of composite material | % | 92 | ← | ← | ← | ← | 90 | 83 |

| | | Comparative Example 2 | Comparative Example 3 | Comparative Example 4 | Example 7 | Example 8 |
|---|---|---|---|---|---|---|
| Holes in spinneret | No. | ← | ← | ← | 24000 × 2 | 30000 × 2 |
| Spinneret diameter | mm | ← | ← | ← | 0.05 | 0.065 |
| Doubling position | | ← | ← | ← | After downstream stretching process | ← |
| Moisture content of fiber during I/L | % | 60 | 15 | 30 | ← | ← |
| Tension during I/L | g/dtex | ← | ← | 0.03 | 0.01 | ← |
| I/L pressure | MPa | 0.035 | ← | ← | ← | ← |
| Precursor fiber bundle linear density | tex | ← | ← | ← | 3100 | 6100 |
| Precursor fiber diameter | μm | ← | ← | ← | 8.3 | 10.5 |
| Second carbonization furnace tension | mg/dtex | ← | ← | ← | 482 | 396 |
| Carbon fiber bundle linear density | g/m | ← | ← | ← | 1.7 | 3.3 |
| Strand tensile strength | MPa | 6000 | 5500 | 6000 | 6300 | 5700 |
| Strand tensile modulus | GPa | ← | ← | ← | 290 | 285 |
| X-ray measured crystallite size (Lc) | Å | ← | ← | ← | 18.1 | 19 |
| X-ray measured degree of crystal orientation | % | ← | ← | ← | 81.9 | 81.3 |
| Specific weight | g/cm³ | ← | ← | ← | 1.80 | 1.79 |
| Fiber diameter | μm | ← | ← | ← | 4.9 | 6.2 |
| CF fuzzy fiber grade | Good/Poor | ← | ← | Poor | Good | ← |
| Bundle divided rate | % | 3.1 | 0.6 | 2.6 | 0.8 | 0.9 |
| 0-TS conversion of composite material | % | 85 | 82 | 85 | 90 | ← |

Conclusion 1

As listed in Table 1, in examples 1 to 6, in which fluids under pressures in the range of 0.01 to 0.05 MPa were applied in the interlacing process onto the coagulated fiber bundles with moisture contents in the range of 25 to 50% under tensions of 0.02 g/dtex or less, the achieved strand tensile strengths were equal to or greater than 5,600 MPa, and the yarn bundle divided rate did not exceed 2%. The composite materials formed using the carbon fiber bundles produced through the interlacing process had the 0-TS conversion percentage of 90% or more.

As listed in Table 1, in examples 1 to 4, in which fluids under pressures in the range of 0.01 to 0.04 MPa were applied in the interlacing process onto the coagulated fiber bundles with moisture contents in the range of 25 to 35% under tensions of 0.015 g/dtex or less, the achieved strand strengths were equal to or greater than 6,000 MPa, or at least equivalent to the strand strengths in comparative examples 2 and 4, and the yarn bundle divided rate did not exceed 1.4%. The composite materials formed using the carbon fiber bundles produced through the interlacing process had the 0-TS conversion percentage of 92% or more. The carbon fibers produced through this process had filament diameters in the range of 4.9 to 5.7 μm.

As listed in Table 1, in examples 2 to 4, in which fluids under pressures in the range of 0.02 to 0.04 MPa were applied in the interlacing process onto the coagulated fiber bundles with moisture contents in the range of 25 to 35% under tensions of 0.01 g/dtex or less, the achieved strand strengths were equal to or greater than 6,000 MPa, or at least equivalent to the strand strengths in comparative examples 2 and 4, and the yarn bundle divided rate did not exceed 0.8%. The composite materials formed using the carbon fiber bundles produced through the interlacing process had the 0-TS conversion percentage of 92% or more. The carbon fibers produced through this process had filament diameters in the range of 4.9 to 5.7 μm.

In comparative example 1, in which the blowing pressure (gauge pressure) of the pressurized air in the interlacing process was 0.07 MPa, or higher than 0.05 MPa, the resultant carbon fiber bundle had a strand tensile strength of 5,500 MPa, or less than 5,600 MPa. The 0-TS conversion percentage was also lower than 90%. The yarn bundle divided rate was 0.6% in comparative example 1.

In comparative example 2, in which the moisture content was 60%, or higher than 50%, the resultant carbon fiber bundle had a yarn bundle divided rate of 3.1%, and the 0-TS conversion percentage was lower than 90%. In comparative example 2, the strand tensile strength was 6,000 MPa.

In comparative example 3, in which the moisture content was 15%, or lower than 25%, the resultant carbon fiber bundle had a strand tensile strength of 5,500 MPa, or less than 5,600 MPa. The 0-TS conversion percentage was also lower than 90%. The yarn bundle divided rate was 0.6% in comparative example 3. Comparative examples 2 and 3 indicate that the moisture content may be 25 to 50%.

In comparative example 4, in which the tension during the interlacing process was 0.03 g/dtex, or higher than 0.02 g/dtex, the resultant carbon fiber bundle had a yarn bundle divided rate of 2.6%, and the 0-TS conversion percentage was lower than 90%. In comparative example 4, the strand tensile strength was 6,000 MPa. That is, the tension during the interlacing process may be 0.02 g/dtex or less.

In examples 1 to 6, a coagulated fiber bundle (precursor fiber bundle) including at least 30,000 filaments was produced through one spinneret. However, the above interlacing process may be used for one coagulated fiber bundle obtained by combining multiple coagulated fiber bundles together.

Example 7

The same spinning solution as in example 1 was spun through spinnerets having 24,000 spinning holes per spinneret to form two coagulated fiber bundles. After the downstream stretching process, the coagulated fiber bundles were combined together and underwent the water application process and the interlacing process. The conditions in the interlacing process were the same as in example 2. The downstream processes were the same as in example 2 except for a tension of 482 mg/dtex during the second carbonization process.

The resultant carbon fiber bundle had a strand tensile strength of 6,300 MPa, a filament diameter (diameter) of 4.9 μm, a good fuzzy fiber grade (denoted by Good in the table), and a yarn bundle divided rate of 0.8%.

The resultant carbon fiber bundle was used to form a composite material, which had the 0-TS conversion percentage of 90%. Other characteristics of the precursor fiber bundle and the carbon fiber bundle are listed in Table 1.

Example 8

The same spinning solution as in example 1 was spun through spinnerets having 30,000 spinning holes per spinneret to form two coagulated fiber bundles. After the downstream stretching process, the coagulated fiber bundles were combined together and underwent the water application process and the interlacing process. The conditions in the interlacing process were the same as in example 2. The downstream processes were the same as in example 1 except for a tension of 396 mg/dtex during the second carbonization process.

The resultant carbon fiber bundle had a strand tensile strength of 5,700 MPa, a filament diameter (diameter) of 6.2 μm, a good fuzzy fiber grade (denoted by Good in the table), and a yarn bundle divided rate of 0.9%.

The resultant carbon fiber bundle was used to form a composite material, which had the 0-TS conversion percentage of 90%. Other characteristics of the precursor fiber bundle and the carbon fiber bundle are listed in Table 1.

Conclusion 2

Also when multiple (two or more) coagulated fiber bundles are combined together into one coagulated fiber bundle including at least 30,000 filaments, in the same manner as in examples 1 to 6, a fluid under a pressure in the range of 0.01 to 0.05 MPa was applied in the interlacing process onto the coagulated fiber bundle with a moisture content in the range of 25 to 50% under a tension of 0.02 g/dtex or less. The achieved strand tensile strength was equal to or greater than 5,600 MPa, and the yarn bundle divided rate did not exceed 1%, or not greater than 2%. The composite material formed using the carbon fiber bundle produced through the interlacing process had the 0-TS conversion percentage of 90% or more. The carbon fibers produced through this process had a filament diameter in the range of 4.9 to 6.2 μm, and a strand tensile strength in the range of 5,700 to 6,300 MPa.

The invention claimed is:

1. A method for manufacturing a precursor fiber bundle, the method comprising:
    spinning by extruding a spinning solution through a spinneret to produce a coagulated fiber bundle;
    applying an oil agent to the coagulated fiber bundle to produce an oiled coagulated fiber bundle;
    drying and densifying the oiled coagulated fiber bundle to produce a dried and densified coagulated fiber bundle;
    steam stretching the dried and densified coagulated fiber bundle to produce a steam-stretched coagulated fiber bundle;
    applying water to the steam-stretched coagulated fiber bundle to obtain a water-applied coagulated fiber bundle having a moisture content in a range of 25~50%; and
    interlacing the water-applied coagulated fiber bundle by applying a fluid onto the water-applied coagulated fiber bundle.

2. The method according to claim 1, wherein the interlacing includes applying the fluid under a pressure in a range of 0.01 to 0.05 MPa onto the coagulated fiber bundle under a tension of 0.001 to 0.015 g/dtex.

3. The method according to claim 1, wherein the coagulated fiber bundle includes at least 30,000 coagulated fibers.

4. The method according to claim 2, wherein the coagulated fiber bundle includes at least 36,000 coagulated fibers.

5. The method according to claim 3, wherein the spinning includes extruding the coagulated fiber bundle through one spinneret.

6. A method for manufacturing a carbon fiber bundle from a precursor fiber bundle, comprising:
    oxidizing a precursor carbon fiber bundle to form an oxidized carbon fiber bundle, and
    carbonizing the oxidized carbon fiber bundle,
    wherein
    the precursor fiber bundle is manufactured with the method according to claim 1.

7. A carbon fiber bundle, comprising:
    a fiber bundle including at least 48,000 filaments,
    wherein the filaments each have a roundness of at least 0.9, a diameter in a range of 4.8 to 6.5 μm, and a tensile strength of at least 5,600 MPa.

8. The carbon fiber bundle according to claim 7, wherein when the carbon fiber bundle is run at a rate of 50 ft/min for 2 minutes between urethane sheets on which a 125-g weight is placed, a quantity of carbon fibers left on the urethane sheets is 40 μg/ft or less.

9. The carbon fiber bundle according to claim 8, wherein the carbon fiber bundle has a yarn bundle divided rate of 2% or less as determined by passing a 13 mm-diameter round metal bar through a U-shaped carbon fiber bundle having a 300-g weight attached to lower ends thereof, repeating a 140-mm drop test three times, subjecting the carbon fiber bundle after the drop test, excluding a part contacted with the round metal bar, to image analysis to measure an area of a slit formed due to yarn bundle divides and an area of a strand portion, and taking a percentage of the area of the slit due to the yarn bundle divides in the area of the strand portion as the yarn bundle divided rate.

10. The carbon fiber bundle according to claim 9, wherein the carbon fiber bundle allows a composite material comprising the carbon fiber bundle and a resin material to have a tensile strength of 90% or more of a tensile strength of a strand.

11. The carbon fiber bundle according to claim 7, wherein the carbon fiber bundle has a tensile modulus of at least 285 to no more than 290 GPa.

\* \* \* \* \*